US012637098B2

(12) United States Patent
Lee et al.

(10) Patent No.: US 12,637,098 B2
(45) Date of Patent: May 26, 2026

(54) VEHICLE AND CONTROL METHOD THEREOF

(71) Applicants: Hyundai Motor Company, Seoul (KR); Kia Corporation, Seoul (KR)

(72) Inventors: Indong Lee, Incheon (KR); Seunghoon Jeon, Incheon (KR); Donghyuk Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 119 days.

(21) Appl. No.: 18/589,709

(22) Filed: Feb. 28, 2024

(65) Prior Publication Data
US 2024/0425072 A1 Dec. 26, 2024

(30) Foreign Application Priority Data
Jun. 20, 2023 (KR) ........................ 10-2023-0078686

(51) Int. Cl.
*B60W 50/14* (2020.01)
*B60W 30/14* (2006.01)

(52) U.S. Cl.
CPC .......... *B60W 50/14* (2013.01); *B60W 30/143* (2013.01); *B60W 2420/54* (2013.01); *B60W 2554/80* (2020.02)

(58) Field of Classification Search
CPC ......... B60Q 9/06; B60Q 9/008; B60W 30/09; B60W 30/143; B60W 40/02; B60W 50/14; B60W 2050/0052; B60W 2050/143; B60W 2420/54; B60W 2554/80; B60W 2554/802; B60Y 2300/09; G01S 7/527; G01S 15/931; G01S 2015/932; G01S 2015/938

USPC .......................................................... 701/93
See application file for complete search history.

(56) References Cited

U.S. PATENT DOCUMENTS

| | | | | |
|---|---|---|---|---|
| 2005/0288842 A1* | 12/2005 | Brewer | ............ | B60G 17/01933 340/440 |
| 2008/0266052 A1* | 10/2008 | Schmid | ............... | G01S 7/52004 340/5.1 |
| 2009/0254260 A1* | 10/2009 | Nix | ......................... | G01S 15/10 348/148 |
| 2015/0062935 A1* | 3/2015 | Braunberger | .......... | B60Q 1/444 362/466 |
| 2019/0113916 A1* | 4/2019 | Guo | ...................... | A61B 5/6893 |
| 2019/0372750 A1* | 12/2019 | Wang | .................... | H04L 7/0054 |
| 2021/0107472 A1* | 4/2021 | Rachor | ........... | B60W 30/18163 |

(Continued)

FOREIGN PATENT DOCUMENTS

| | | | | |
|---|---|---|---|---|
| CN | 117581117 A | * | 2/2024 | ........... G01S 17/931 |
| DE | 102021107602 A1 | * | 10/2021 | ............ B60W 40/08 |

(Continued)

*Primary Examiner* — Atul Trivedi
(74) *Attorney, Agent, or Firm* — Banner & Witcoff, Ltd.

(57) ABSTRACT

A vehicle may include: a sensor configured to detect an object outside of the vehicle; and a controller configured to perform a warning mode for generating a warning in response to the object being detected by the sensor, wherein the warning mode includes a first mode for detecting the object in a first preset driving condition of the vehicle and a second mode for detecting the object in a second preset driving condition of the vehicle, and wherein a number of object detection attempts in the second mode is set to be relatively greater than a number of object detection attempts in the first mode.

20 Claims, 10 Drawing Sheets

(56) References Cited

U.S. PATENT DOCUMENTS

| | | | | |
|---|---|---|---|---|
| 2021/0237581 A1* | 8/2021 | Rajaie | ............... | B60L 15/2009 |
| 2021/0309219 A1* | 10/2021 | Newman | ............. | G05D 1/0214 |
| 2021/0331681 A1* | 10/2021 | Im | ......................... | B60W 50/08 |
| 2021/0354722 A1* | 11/2021 | Kim | ...................... | B60K 35/85 |
| 2021/0403051 A1* | 12/2021 | Jaegal | ............. | B60W 60/0059 |
| 2023/0076599 A1* | 3/2023 | Hung | ................. | G06F 9/30072 |
| 2023/0123587 A1* | 4/2023 | Jatt | ..................... | B60W 30/06 |
| | | | | 701/23 |
| 2023/0127044 A1* | 4/2023 | Takagi | ................. | B60W 30/09 |
| | | | | 701/301 |
| 2023/0128234 A1* | 4/2023 | Okabe | ................... | G01S 13/08 |
| | | | | 701/301 |
| 2023/0360232 A1* | 11/2023 | Kocamaz | ............... | G06T 7/246 |
| 2024/0308513 A1* | 9/2024 | Gupta | ................. | B60W 40/02 |
| 2025/0376163 A1* | 12/2025 | Almadani | .......... | B60W 30/162 |

FOREIGN PATENT DOCUMENTS

| | | | | | | |
|---|---|---|---|---|---|---|
| EP | 4546034 | A1 | * | 4/2025 | ............ | B60K 35/22 |
| GB | 2556690 | A | * | 6/2018 | ............ | B60W 30/09 |
| JP | 2003272100 | A | * | 9/2003 | | |
| JP | 2004224093 | A | * | 8/2004 | | |
| JP | 2025007468 | A | * | 1/2025 | | |
| WO | WO-2017180365 | A1 | * | 10/2017 | ............ | B60W 30/09 |
| WO | WO-2023032568 | A1 | * | 3/2023 | ............ | G01S 7/292 |

* cited by examiner

VEHICLE AND CONTROL METHOD THEREOF

CROSS-REFERENCE TO RELATED APPLICATION

This application claims under 35 U.S.C. § 119 the benefit of Korean Patent Application No. 10-2023-0078686, filed on Jun. 20, 2023 in the Korean Intellectual Property Office, the entire contents of which are incorporated herein by reference.

BACKGROUND

1. Field

The disclosure relates to a Parking Distance Warning control of a vehicle and a sensor therefor.

2. Description of the Background

A Parking Distance Warning (PDW) sensor of a vehicle may inform a driver of a distance between the vehicle and objects around the vehicle while driving or parking. For example, a PDW sensor may include a plurality of ultrasonic sensors mounted on a bumper of a vehicle, and a distance between the vehicle and an object around the vehicle may be calculated based on a time it takes for an ultrasonic signal transmitted from the ultrasonic sensor to reflect from the object and return. If the calculated distance is within a preset range, a warning may be output, and for a shorter distance, a louder warning sound or a warning sound may be output and/or may be output repeatedly at a shorter interval.

When measuring a distance to an object using an ultrasonic signal, the above-described PDW sensor may generate a false warning that an object has been detected even though the object does not actually exist, due to an ultrasonic signal interference (i.e. unintended noisy ultrasonic signal) from another ultrasonic signal source, for example.

SUMMARY

The following summary presents a simplified summary of certain features. The summary is not an extensive overview and is not intended to identify key or critical elements.

Systems, apparatuses, and methods are described for parking distance warning control of a vehicle. A vehicle may comprise: a sensor configured to detect an object outside of the vehicle; and a controller configured to cause object detection according to a warning mode for generating a warning based on the object being detected by the sensor. The warning mode comprises, in a first preset driving condition of the vehicle, a first mode for detecting the object and, in a second preset driving condition of the vehicle different from the first preset driving condition, a second mode for detecting the object, and a number of object detection attempts in the second mode is set to be greater than a number of object detection attempts in the first mode.

A control method of a vehicle comprising a sensor configured to detect an object outside of the vehicle and a controller configured to control object detection according to a warning mode for generating a warning in response to the object being detected by the sensor may comprise: causing, based on the vehicle satisfying a first preset driving condition, object detection according to a first mode of the warning mode; and causing, based on the vehicle satisfying a second preset driving condition, object detection according to a second mode of the warning mode. A number of object detection attempts in the second mode may be set to be greater than a number of object detection attempts in the first mode.

These and other features and advantages are described in greater detail below.

BRIEF DESCRIPTION OF THE DRAWINGS

These and/or other examples of the disclosure will become apparent and more readily appreciated from the following description of various examples, taken in conjunction with the accompanying drawings of which.

DETAILED DESCRIPTION

Figure 1:
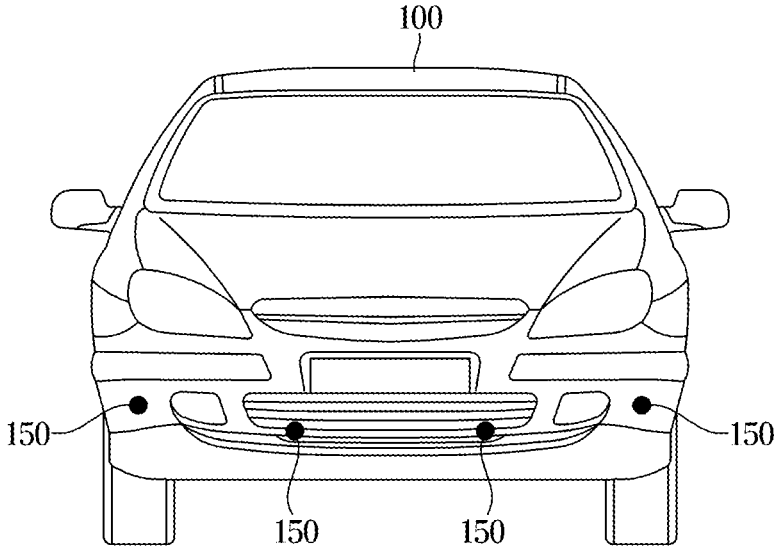
FIG. 1 is a diagram illustrating Parking Distance Warning (PDW) sensors of a vehicle according to an example of the present disclosure.
Figure 1:
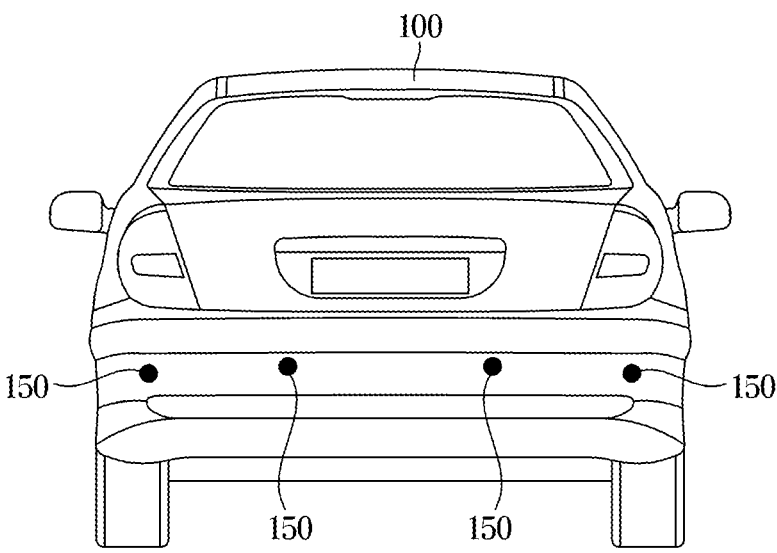

Like reference numerals throughout the specification denote like elements. Also, this specification does not describe all the elements according to examples of the disclosure, and descriptions well-known in the art to which the disclosure pertains or overlapped portions are omitted. The terms such as "~part", "~member", "~module", "~block", and the like may refer to at least one process processed by at least one hardware or software. According to examples, a plurality of "~part", "~member", "~module", "~block" may be embodied as a single element, or a single of "~part", "~member", "~module", "~block" may include a plurality of elements.

It will be understood that when an element is referred to as being "connected" to another element, it may be directly or indirectly connected to the other element, wherein the indirect connection includes "connection" via a wireless communication network.

It will be understood that the term "include", "has", or "comprise", and the like, when used in this specification, specifies the presence of stated features, integers, steps, operations, elements, and/or components, but does not preclude the presence or addition of at least one other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc., may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, examples of the disclosure will be described in detail with reference to the accompanying drawings. Examples of the disclosure will also, in part, will be obvious from the description, or may be learned by practice of the disclosure.

FIG. 1 is a diagram illustrating Parking Distance Warning (PDW) sensors of a vehicle.

As shown in FIG. 1, a plurality of PDW sensors 150 may be mounted on the front and rear of the vehicle 100, particularly on the front and rear bumpers. The PDW sensor 150 is provided in a vehicle 100 to measure a distance from the vehicle 100 to an object around the vehicle 100, when the vehicle 100 is stopped or driven at a low speed. It is illustrated in FIG. 1 that four PDW sensors 150 are mounted at the front of the vehicle 100 and four PDW sensors 150 are mounted at the rear of the vehicle 100. The number of PDW sensors 150 is not limited as long as it is one or more.

Although not shown in FIG. 1, as required, a plurality of PDW sensors may be mounted on the left and right sides of the vehicle 100 to recognize a distance between the vehicle 100 and an object located on both sides of the vehicle 100.

Figure 2:
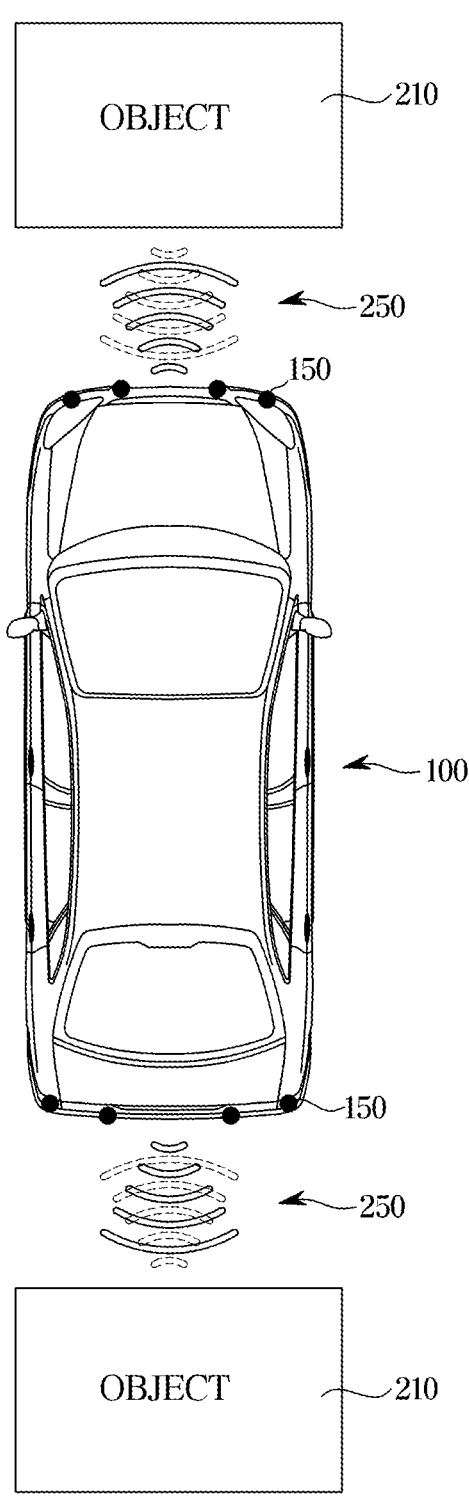
FIG. 2 is a diagram illustrating an operation of a PDW sensor of a vehicle according to an example of the present disclosure.

FIG. 2 is a diagram illustrating an operation of a PDW sensor of a vehicle according to an example.

As shown in FIG. 2, the plurality of PDW sensors 150 mounted on the vehicle 100 disclosure are ultrasonic sensors. The PDW sensor 150 may generate and/or transmit/send an ultrasonic signal, and/or receive the ultrasonic signal reflected from an object 210 located around (e.g., at a location outside of and relative to) the vehicle 100. A distance d between the vehicle 100 and the object 210 (more specifically, the distance between the PDW sensor 150 and the object 210) may be calculated based on a period of time t between transmission and reception of the ultrasonic signal, and a propagation speed s of the ultrasonic signal. Because the period of time t is a time period until an ultrasonic signal is reflected and is received back by the PDW sensor 150 after the ultrasonic signal reaches the object 210, the actual distance d may be calculated as half of the product of time t and speed s, i.e., d=(ts)/2.

By using the above-described distance measurement function of the PDW sensor 150, the distance between the vehicle 100 and the object 210 may be measured. A normal parking distance warning may be generated to inform a driver of the measured distance (e.g., if the measured distance satisfies a distance criteria, such as a threshold and/or range). For example, in a case where a distance between the vehicle 100 and the object 210 is within a maximum of 100 cm, a parking distance warning (e.g., repetitive beeps) may be generated. As the distance decreases (e.g., 100 cm-60 cm-30 cm-20 cm-10 cm), a repetition period of the beeps may shorten and/or a volume of the beeps may increase, enabling the driver to recognize the distance between the vehicle 100 and the object 210 through the changing repetition period and/or volume of the beeps.

Figure 3:
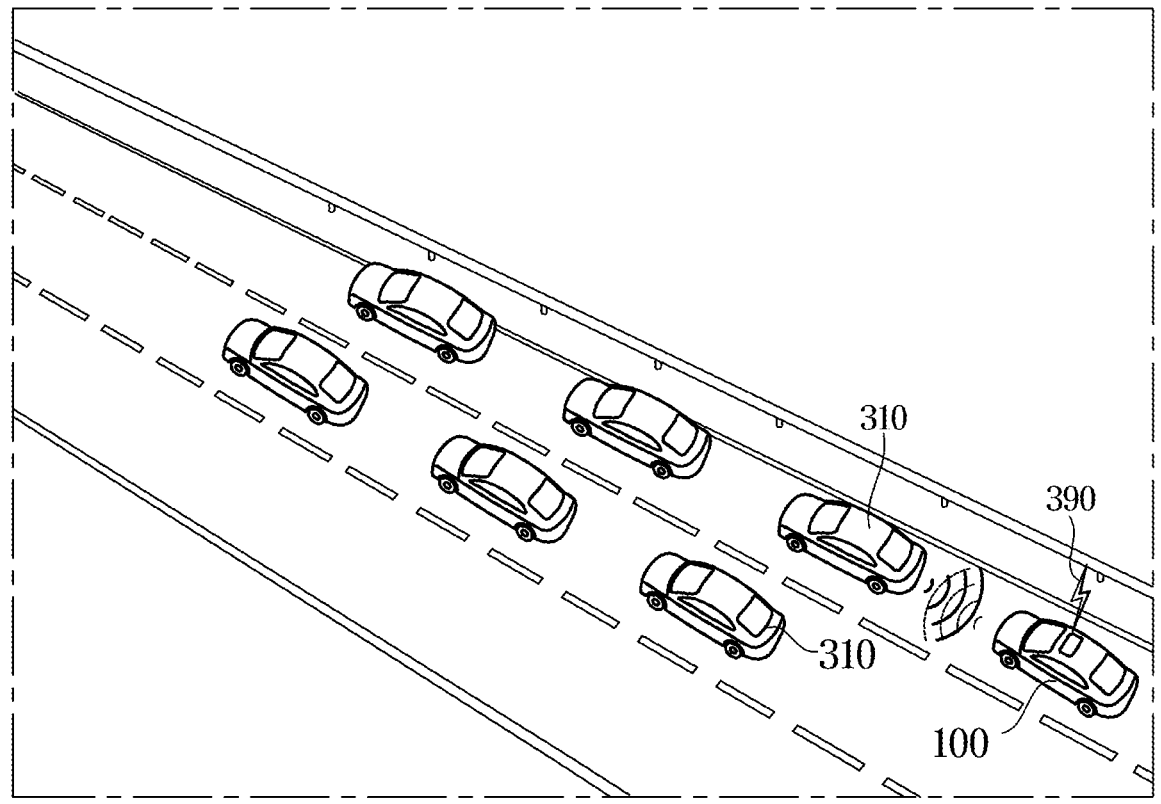
FIG. 3 is a diagram illustrating an example where a vehicle operates in a noise avoidance mode.

FIG. 3 is a diagram illustrating an example where a vehicle according to an example operates in a noise avoidance mode.

While being driven/operated, the vehicle 100 may stop to wait for a turn signal at an intersection, and/or may stop and/or drive slowly due to traffic congestion, and the like. For example, in FIG. 3, the vehicle 100 is shown stopped or traveling slowly due to traffic congestion. In such a situation, an ultrasonic signal transmitted from another ultrasonic signal source around the vehicle 100, for example, a PDW sensor of another vehicle 310, may be received by the PDW sensor 150 of the vehicle 100. In this case, the vehicle 100 may incorrectly recognize the ultrasonic signal received from the other vehicle 310 as a reflected signal of the ultrasonic signal transmitted by the vehicle itself, thereby generating a false warning 390. However, according to an example, an occurrence of the false warning 390 in the above situation may be minimized by performing a noise avoidance mode according to the present disclosure. The noise avoidance mode according to an example of the present disclosure will be described in detail with reference to the drawings later.

Figure 4:
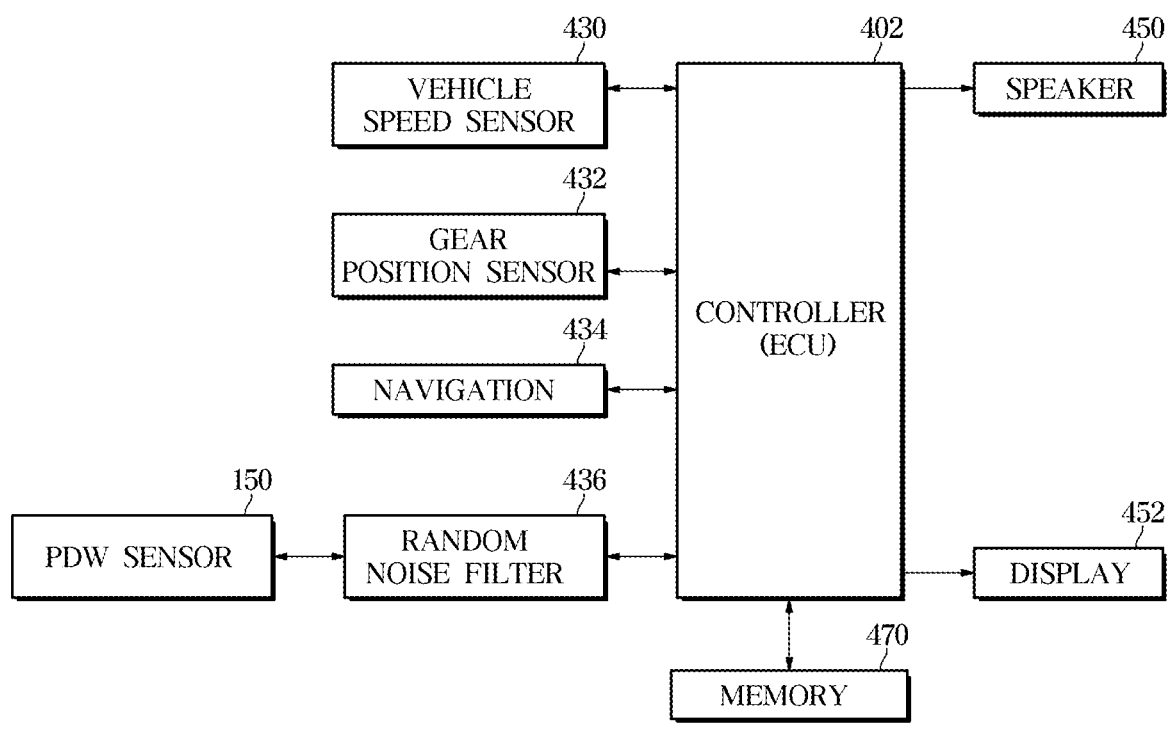
FIG. 4 is a control block diagram illustrating a vehicle and/or computing device/system for a vehicle according to an example of the present disclosure.

FIG. 4 is a control block diagram illustrating a vehicle and/or computing device/system for a vehicle according to an example of the present disclosure.

As shown in FIG. 4, a controller 402 may be an Electronic Control Unit (ECU) that controls an overall or a portion of operation of the vehicle 100. The controller 402 may be communicatively connected to and/or comprise one or more of a vehicle speed sensor 430, a gear position sensor 432, a navigation 434, the PDW sensor 150, a random noise filter 436, a speaker 450, a display 452, and/or a memory 470.

The vehicle speed sensor 430 may detect a current speed of the vehicle 100. The controller 402 may obtain information about the current speed of the vehicle 100 from the vehicle speed sensor 430. The controller 402 may determine a state of the vehicle such as temporary stopping while the vehicle 100 is being driven/operated, for example, based on speed information of the vehicle 100 detected by the vehicle speed sensor 430.

The gear position sensor 432 may detect which gear the vehicle 100 is currently in. The controller 402 may determine a state of the vehicle 100, such as temporary stopping while driving, based on the gear position sensor 432.

The navigation 434 may provide route guidance to a driver. The controller 402 may obtain information about the current speed and/or traffic conditions of the vehicle 100 from the navigation 434. In addition, or alternatively, the controller 402 may determine a state of the vehicle such as temporary stopping after driving, based on the navigation 434.

The PDW sensor 150 may measure a distance from the vehicle 100 to a nearby object (e.g., the object 210 in FIG. 2 or the vehicles 310 in FIG. 3) while the vehicle 100 is stopped or driving at a low speed. The controller 402 may generate repetitive beeps as a parking distance warning based on the distance measurement result of the PDW sensor 150. Here, a repetition period of the beeps corresponds to the distance between the vehicle 100 and the nearby object. In addition, the controller 402 may perform a noise avoidance mode according to an example with respect to a noise signal which is an unintended noisy ultrasonic signal transmitted from another vehicle (e.g., the vehicles 310 in FIG. 3) and received by the PDW sensor 150. Accordingly, occurrence of false warnings may be minimized.

The random noise filter 436 may remove a noise signal received non-periodically (that is, received randomly) by the PDW sensor 150 by filtering.

The speaker 450 may output an audible parking distance warning (e.g., beeps).

Instead of, or in addition to, the speaker 450, a buzzer which is a typical beep output means may be used.

The display 452 may output a visual parking distance warning (e.g., flashing a specific color and/or displaying a numeric distance). The display 452 may comprise a Liquid Crystal Display (LCD) and/or a Light Emitting Diode (LED).

The memory 470 may store data generated during a control process of the controller 402, software/firmware required for the controller 402, and the like.

The controller 402 may be implemented as a memory (e.g., the memory 470) that stores (e.g., on a non-transitory computer readable medium) an algorithm and/or instructions for controlling operations of constituent components of the vehicle 100 or data about a program that reproduces the algorithm. The controller 402 may comprise one or more processors configured to performs the above-described operations using the data stored in the memory. In this instance, the memory (e.g., memory 470) and the one or more processors may be provided as one chip, and/or provided as separate chips.

The memory (e.g., memory 470) may be implemented with at least one of a volatile memory such as Random Access Memory (RAM), a non-volatile memory such as Read Only Memory (ROM), Programmable Read Only Memory (PROM), Erasable Programmable Read Only Memory (EPROM), or Electrically Erasable Programmable Read Only Memory (EEPROM), or storage medium such as Hard Disk Drive (HDD) and Compact Disc Read Only Memory (CD-ROM), without being limited thereto.

The display 452 may be provided as a Cathode Ray Tube (CRT), a Digital Light Processing (DLP) panel, a Plasma Display Panel (PDP), Liquid Crystal Display (LCD) panel, Electro Luminescence (EL) panel, Electrophoretic Display (EPD) panel, Electrochromic Display (ECD) panel, Light Emitting Diode (LED) panel, Organic LED (OLED) panel, and the like, without being limited thereto.

At least one constituent component may be added or omitted corresponding to the performance of the constituent components of the vehicle illustrated in FIG. 4. Also, it will be easily understood by those skilled in the art that mutual positions of the constituent components may be modified corresponding to the performance or structure of the system.

Each of the constituent components shown in FIG. 4 may be implemented as one or more of a software and/or a hardware component, such as a Field-Programmable Gate Array (FPGA) and/or an Application-Specific Integrated Circuit (ASIC).

Figure 5:
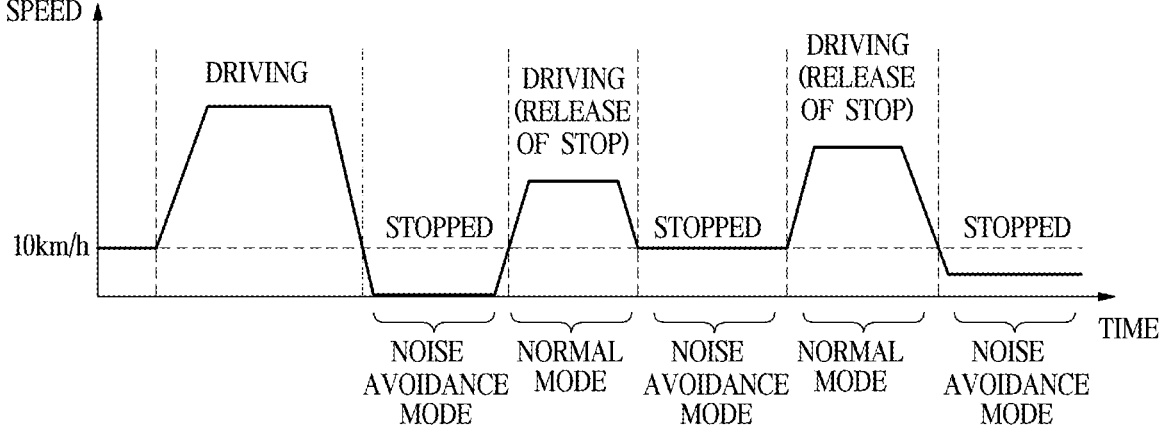
FIG. 5 is a diagram illustrating a parking distance warning mode of a vehicle according to an example of the present disclosure.

FIG. 5 is a diagram illustrating a parking distance warning mode of a vehicle according to an example of the present disclosure.

A parking distance warning mode of the vehicle 100 according to an example includes two modes: 'normal mode (first mode)' and 'noise avoidance mode (second mode)'.

The normal mode and the noise avoidance mode in the parking distance warning mode according to an example may have differences in a driving condition in which each mode is executed, and the number of object detection cycles in each mode.

As shown in FIG. 5, in the parking distance warning mode according to an example, the 'normal mode' is performed when the vehicle 100 is traveling (for example, when the vehicle resumes driving after temporary stop), and the 'noise avoidance mode' is performed when the vehicle 100 is temporarily stopped while driving. Here, the 'temporary stopping while driving' may include coming to a complete stop (vehicle speed=0 km/h) or driving slowly (e.g., below a preset speed (e.g., less than or equal to 10 km/h). That is, while the vehicle 100 is traveling in excess of the preset speed (e.g., 10 km/h), the normal mode of the parking distance warning mode may be performed. If the vehicle 100 drives above the preset speed (e.g., 10 km/h), and then slows down below 10 km/h and/or stops, the parking distance warning mode may be switched to the noise avoidance mode. Here, although the 'temporary stopping while driving' refers to instances where the vehicle 100 initially travels above the preset speed (e.g., 10 km/h), and then decelerates below 10 km/h or stops, a case where the vehicle 100 is stopped at one location for a relatively long time (e.g., several minutes or more) is not included in the 'temporary stopping while driving'. In an example, the preset speed that distinguishes the 'temporary stopping while driving' from driving (traveling) is not limited to 10 km/h, and other reference speeds may be applied in consideration of a type of vehicle 100, a driving environment (e.g., speed limits, traffic conditions, location), user settings/driving history/preferences, and the like. In an example of the disclosure, the case where the vehicle 100 is stopped at one location for a relatively long time (e.g., several minutes or more) is classified as 'long-term stopping'.

Figure 6:
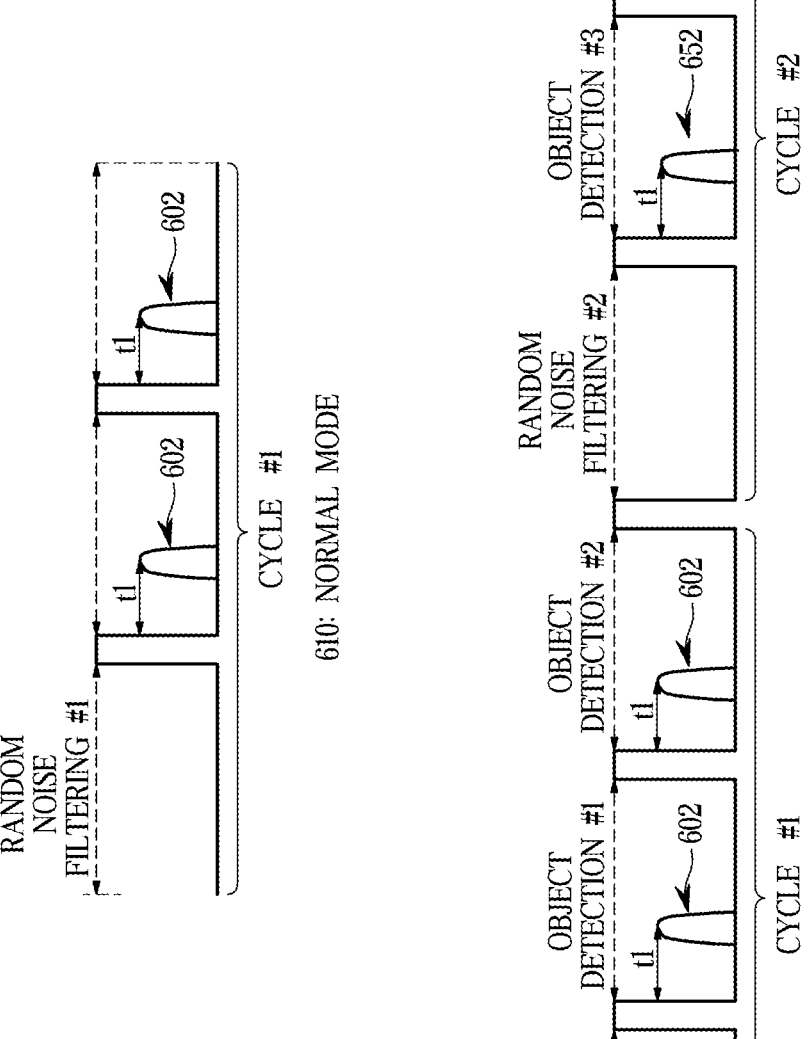
FIG. 6 is a diagram illustrating a normal mode referred to as 610 and a noise avoidance mode referred to as 650 of a parking distance warning mode of a vehicle according to an example of the present disclosure.

FIG. 6 is a diagram illustrating a normal mode 610 and a noise avoidance mode 650 of a parking distance warning system/method of a vehicle according to an example of the present disclosure.

As shown in FIG. 6, the normal mode 610 may include periods (e.g., time intervals) of a random noise filtering #1, an object detection #1, and an object detection #2. In the random noise filtering #1, noise signals that are non-periodically received by the PDW sensor 150 of the vehicle 100 may be removed by filtering (e.g., with the random noise filter 436). In the object detection #1 and the object detection #2, the presence and/or absence and/or distances of objects around the vehicle 100 may be detected/determined using the PDW sensor 150 of the vehicle 100. The PDW sensors 150 of the vehicle 100 may transmit an ultrasonic signal and one or more of the PDW sensors may receive a reflected ultrasonic signal at equal intervals in each of the object detection #1 and the object detection #2. Accordingly, in the normal mode 610, in a case where an ultrasonic signal transmitted from the PDW sensor 150 of the vehicle 100 is reflected by an object (e.g., the object 210 in FIG. 2) and then is received by one of the PDW sensors 150 (e.g., the transmitting PDW sensor 150), ultrasonic signals may be received (object detection) at approximately equal intervals/time-points/time periods/delays t1 within each of the object detection #1 and the object detection #2, as shown in 602 in FIG. 6. Including two object detection periods/intervals (e.g., at a time scale such that a location of an object 210 relative to the vehicle 100 does not change substantially or changes predictably relative to a location of the vehicle) may confirm that a received ultrasonic signal is a reflection from an object.

Unlike the normal mode 610 including a single cycle (cycle #1), the noise avoidance mode 650 may include a plurality of cycles, such as two cycles, cycle #1 and cycle #2 For example, the cycle #2 may be performed after the cycle #1 of the normal mode 610. The cycle #1, i.e., a first cycle of the noise avoidance mode 650, may include a random noise filtering #1, object detection #1, and object detection #2. Operations in the random noise filtering #1, the object detection #1, and the object detection #2, constituting the cycle #1 of the noise avoidance mode 650, may be the same as those in the normal mode 610 described above. The cycle #2, i.e., a second cycle of the noise avoidance mode 650, may include a random noise filtering #2, object detection #3, and object detection #4. Operations in the random noise filtering #2, the object detection #3, and the object detection #4, constituting the cycle #2 of the noise avoidance mode 650, may be the same as those in the normal mode 610 described above. As shown in FIG. 6, in the noise avoidance mode 650 of the parking distance warning mode according to an example, object detection (object detection #1 to object detection #4) may be performed a total of four times during the two cycles (cycle #1 and cycle #2). Accordingly, in the noise avoidance mode 650, in a case where an ultrasonic signal transmitted from the PDW sensor 150 of the vehicle 100 is reflected by an object (e.g., the object 210 in FIG. 2) and then is received by a corresponding PDW sensor 150, ultrasonic signals may be received (object detection) at approximately equal intervals (periods) t1 within each of the object detections #1 to #4, as shown in the noise avoidance mode 650 in FIG. 6.

As may be seen in FIG. 6, in the parking distance warning mode according to an example, the number of object detection attempts (two times each) in the cycle #1 and the cycle #2 of the noise avoidance mode 650 is greater than the number of object detection attempts (one time) in the cycle #1 of the normal mode 610. Accordingly, in the noise avoidance mode 650 of FIG. 6, one more cycle for object detection is added compared to the normal mode 610, and thus reliability criteria of the PDW sensor 150 for objects around the vehicle 100 may be enhanced, and a noise avoidance performance may be improved.

Figure 7:
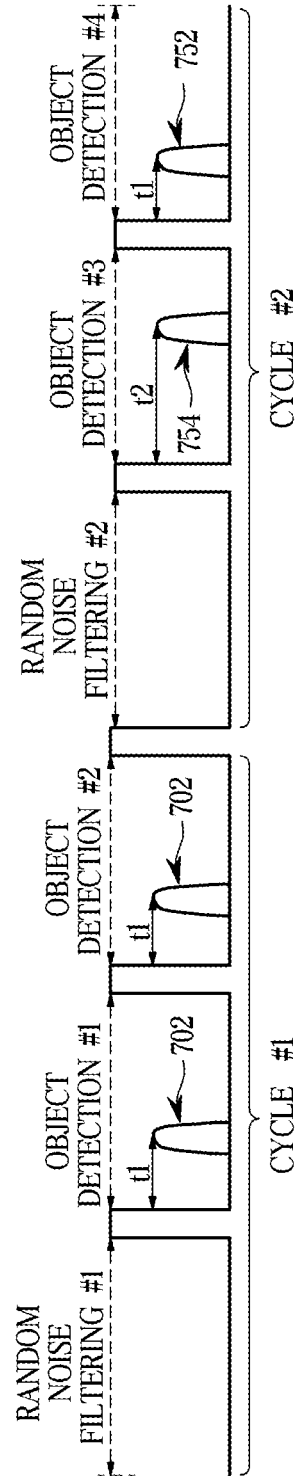
FIG. 7 is a diagram illustrating an example where an ultrasonic signal is received from another vehicle in a noise avoidance mode of a parking distance warning mode of a vehicle according to an example of the present disclosure.

FIG. 7 is a diagram illustrating an example where an ultrasonic signal is received from another vehicle in a noise avoidance mode.

As described above with reference to FIG. 6, in the noise avoidance mode 650, in a case where an ultrasonic signal transmitted from the PDW sensor 150 of the vehicle 100 is reflected by an object (e.g., the object 210 in FIG. 2) and then is normally received by the corresponding PDW sensor 150, ultrasonic signals may be received (object detection) at approximately equal intervals (periods) t1 within each of the object detections #1 to #4, as shown in 652 in FIG. 6.

In other words, because the PDW sensor 150 of the vehicle 100 directly receives the ultrasonic signals transmitted by the PDW sensor 150 itself, although a time delay (time difference) may occur, an interval (period) between receptions of ultrasonic signals is almost the same as an interval (period) between transmission and reception of ultrasonic signal. As a result, ultrasonic signals may be received (object detection may be performed) at approximately equal intervals (periods) t1 as shown in FIG. 6. However, in a case where ultrasonic signals from a different source (e.g., transmitted from one or more other vehicles 310 adjacent to the vehicle 100) are received by the PDW sensor 150 of the vehicle 100 (e.g., in a situation where the vehicle 100 is temporarily stopped and/or moving slowly as shown in FIG. 3) the ultrasonic signals may not be received (object detection may not be performed) at approximately equal intervals (periods) t1 as shown in 652 in FIG. 6 and/or may be received at a random/different interval (period) t2 for at least one of the cycles. This is because it is highly unlikely that transmission intervals (periods) of ultrasonic signals from the other vehicles 310 match the intervals of the object detections #1 to #4 of the PDW sensor 150 of the vehicle 100.

In FIG. 7, it may be seen that ultrasonic signals are received at equal intervals (periods) t1 in the object detection #1 and the object detection #2 of cycle #1, while ultrasonic signals are received at different intervals (periods), t1 (752) and t2 (754), in the object detection #3 and the object detection #4 of cycle #2, indicating the ultrasonic signals are transmitted by another source (e.g., the other vehicles 310) are received by the PDW sensor 150 of the vehicle 100. Accordingly, it may be seen that reception of the ultrasonic signals transmitted from the other vehicles 310 may be easily detected through the noise avoidance mode including the cycle #1 and the cycle #2 according to the example.

Figure 8:
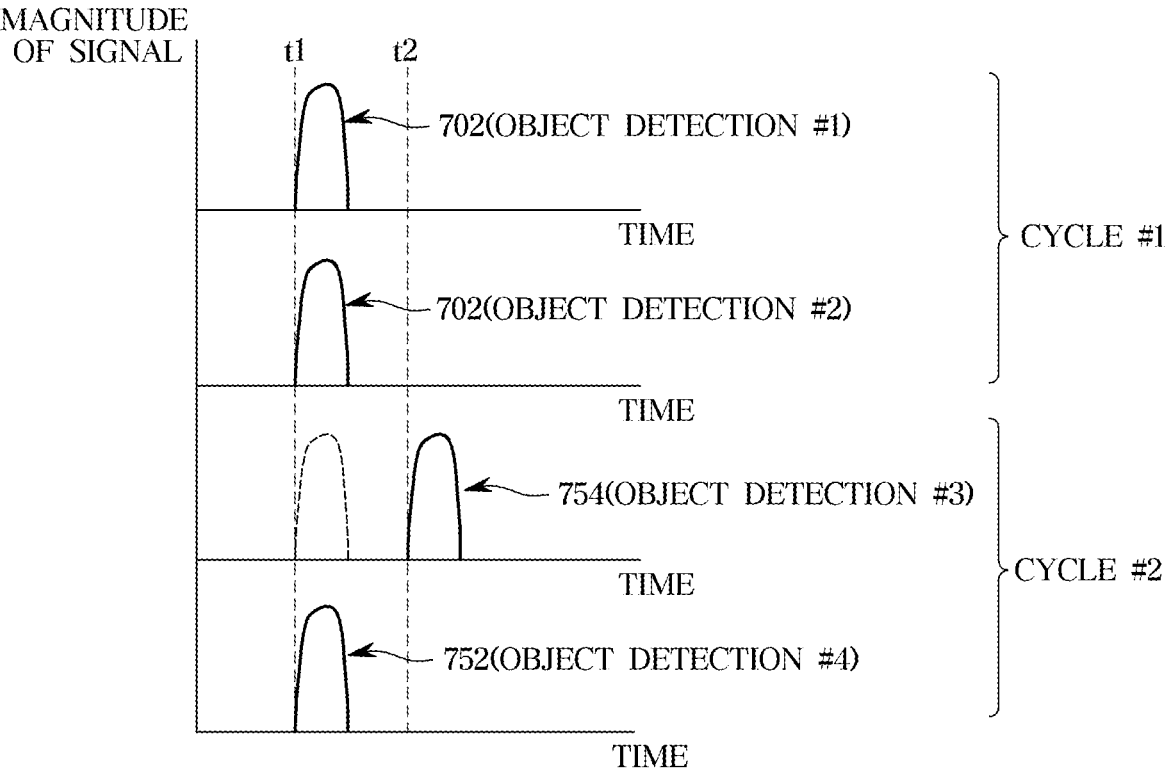
FIG. 8 is a diagram illustrating a reception interval (period) of an abnormally received ultrasonic signal shown in FIG. 7.

FIG. 8 is a diagram illustrating a reception interval (period) of an abnormally received ultrasonic signal shown in FIG. 7. As shown in FIG. 8, ultrasonic signals are received at the same point in time t1 in the object detection #1 and the object detection #2 of cycle #1, while ultrasonic signals are received (754 and 752) at different points in time t2 and t1 in the object detection #3 and object detection #4 of cycle #2. That is, based on the ultrasonic signal reception time point t2 in the object detection #3 being different from the ultrasonic signal reception time point t1 in the object detections #1, #2, and #4, it may be seen that the ultrasonic signal receptions 752 and 754 are abnormal reception of ultrasonic signals transmitted from another source (e.g., the vehicles 310 of FIG. 3) by the PDW sensor 150 of the vehicle 100, not normal reception of ultrasonic signals transmitted from the PDW sensor 150 of the vehicle 100.

Referring back to FIG. 7, in a case where an ultrasonic signal is normally received by the PDW sensor 150 as shown in FIG. 6, the controller 402 of the vehicle 100 may generate a normal parking distance warning as a result of distance measurement based on the ultrasonic signal reception. However, in a case where an ultrasonic signal is abnormally received by the PDW sensor 150 as shown in FIG. 7 and FIG. 8 (e.g., at irregular times in successive object detection periods), the controller 402 may not generate a parking distance warning (i.e., an abnormal parking distance warning) because it is not normal ultrasonic signal reception (e.g., at a regular time within object detection cycles). As a result, output of false warnings due to an abnormal ultrasonic signal reception may be suppressed and/or minimized.

Figure 9:
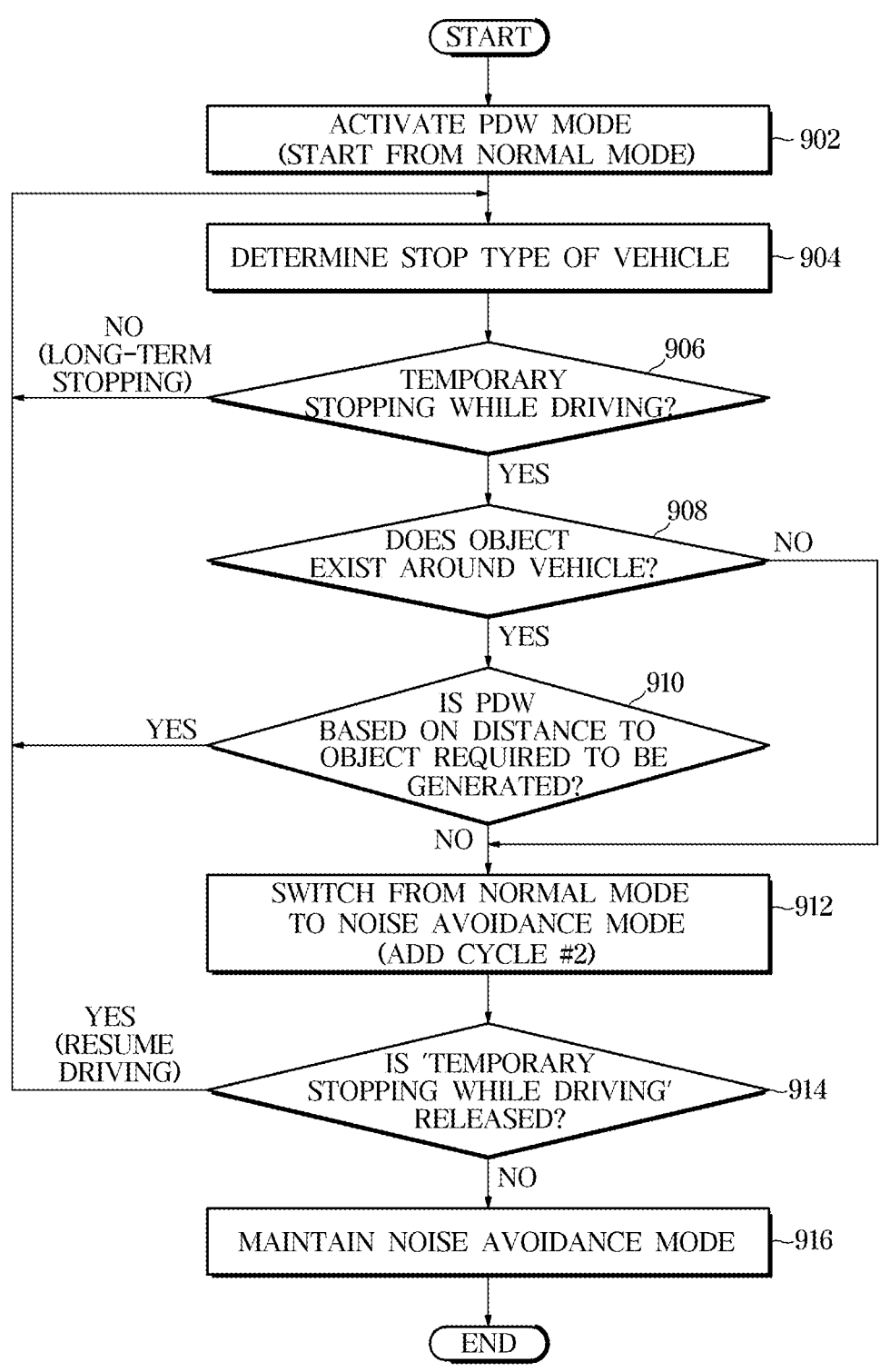
FIG. 9 is a flowchart illustrating a parking distance warning method of a vehicle according to an example of the present disclosure.

FIG. 9 is a flowchart illustrating a parking distance warning method of a vehicle according to an example.

As shown in FIG. 9, in a case where the vehicle 100 is in a stopped state while a parking distance warning mode (PDW mode) of the vehicle 100 is activated (902), the controller 402 may determine a stop type of the vehicle 100 (904). In an example, the stop type of the vehicle 100 may include 'temporary stopping while driving' and 'long-term stopping'. The 'temporary stopping while driving' may include coming to a complete stop from driving (vehicle speed=0 km/h) or driving slowly below a preset speed (e.g., 10 km/h). That is, while the vehicle 100 is traveling at or in excess of the preset speed (e.g., 10 km/h), the normal mode of the parking distance warning mode may be performed. In a case where the vehicle 100 drives above the preset speed (e.g., 10 km/h), and then slows down below 10 km/h and/or stops may be determined as 'temporary stopping while driving'. The 'long-term stopping' may refers to an instance where the vehicle 100 stops at one location for a relatively long time (e.g., several minutes or more). Based on a determination that the stop type of the vehicle 100 is the long-term stopping (No in operation 906), the controller 402 may perform a parking distance warning in the normal mode described with reference to FIG. 5 and FIG. 6, while maintaining the normal mode of operation 902. That is, in a case where the vehicle 100 has been stopped for a long time, i.e., the vehicle 100 has been stationary at a current location for several minutes or more, the controller 402 may determine that little change may occur in the surrounding environment and that an ultrasonic signal from another ultrasonic signal source is unlikely to interfere with the PDW sensor 150 of the vehicle 100, and the controller 402 may continue to perform the normal mode.

If the stop type of the vehicle 100 is determined to be the 'temporary stopping while driving' (Yes in operation 906), the controller 402 may identify whether an object exists around the vehicle 100 (908). In this instance, the controller 402 may use a single cycle of the parking distance warning mode (e.g., cycle #1 of the normal mode 610 or the noise avoidance mode 650 in FIG. 6) to identify whether an object exists around the vehicle 100.

In a case where no other objects exist around the vehicle 100 (No in operation 908), the controller 402 may determine that distance measurement based on object detection is not required and may switch (e.g., immediately upon said determining) the parking distance warning mode of the vehicle 100 from the normal mode to the noise avoidance mode (912).

In a case where an object exists/is detected around the vehicle 100 (Yes in operation 908), the controller 402 may determine whether a parking distance warning based on a distance to the object is required to be generated (910). That is, when a measured distance between the vehicle 100 and the object is within a preset warning range, the controller 402 may generate a normal parking distance warning to urgently notify a driver (Yes in operation 910). For example, in a case where the distance between the vehicle 100 and the object is within a maximum of 100 cm, the parking distance warning (e.g., repetitive beeps) may be generated, and as the distance decreases (e.g., 100 cm-60 cm-30 cm-20 cm-10 cm), a repetition period of the beeps may shorten, enabling the driver to recognize the distance between the vehicle 100 and the object through the changing repetition period of the beeps.

In a case where the measured distance between the vehicle 100 and the object is not within the preset warning range and a normal parking distance warning is not required to be urgently generated (No in operation 910), the controller 402 may switch the parking distance warning mode from the normal mode to the noise avoidance mode (912). To this end, the controller 402 may add one or more cycles (e.g., the cycle #2 of 650 in FIG. 6) to a single cycle (e.g., the cycle #1 of 610 or 650 in FIG. 6) in which an object has been previously detected, thereby identifying a normal ultrasonic signal reception (650 in FIG. 6) due to object detection performed by the PDW sensor 150 or an abnormal ultrasonic signal reception from another ultrasonic signal source (FIG. 7 to FIG. 8). In other words, in the noise avoidance mode according to an example, by adding at least one cycle #2 to cycle #1 of the normal mode, a criteria for determining integrity and/or consistency of ultrasonic signal reception may be enhanced (increase in detection information due to the addition of at least one cycle). In a case where an ultrasonic signal transmitted from another source, such as a nearby vehicle (e.g., the vehicles 310 in FIG. 3), is abnormally received by the PDW sensor 150 of the vehicle 100, the abnormal ultrasonic signal reception may be detected based on the cycle #2 added according to the noise avoidance mode. In the noise avoidance mode according to the example, the parking distance warning (i.e., abnormal parking distance warning) is not generated in the case of the abnormal ultrasonic signal reception. Accordingly, false warnings due to the abnormal ultrasonic signal reception may be suppressed and minimized.

If the 'temporary stopping while driving' is released (Yes in operation 914), i.e., in a case where the vehicle 100 resumes driving at a speed higher than the preset speed (e.g., 10 km/h) from the stopped and/or slowed state, the controller 402 may return to causing object detection according to the normal mode of 902 and/or perform the parking distance warning in the normal mode described with reference to FIG. 5 and FIG. 6. In other words, if the 'temporary stopping while driving' is released and/or the vehicle 100 resumes driving (e.g., accelerates and/or drives at or above the preset speed), the controller 410 may measure a distance between the vehicle 100 and an object for only one cycle #1 as shown at 610 in FIG. 6, and/or may generate a normal parking distance warning to notify a driver of the measured distance.

In contrast, in a case where the vehicle 100 remains the 'temporary stopping while driving' state (No in operation 914), the controller 402 may maintain the noise avoidance mode (916).

Figure 10:
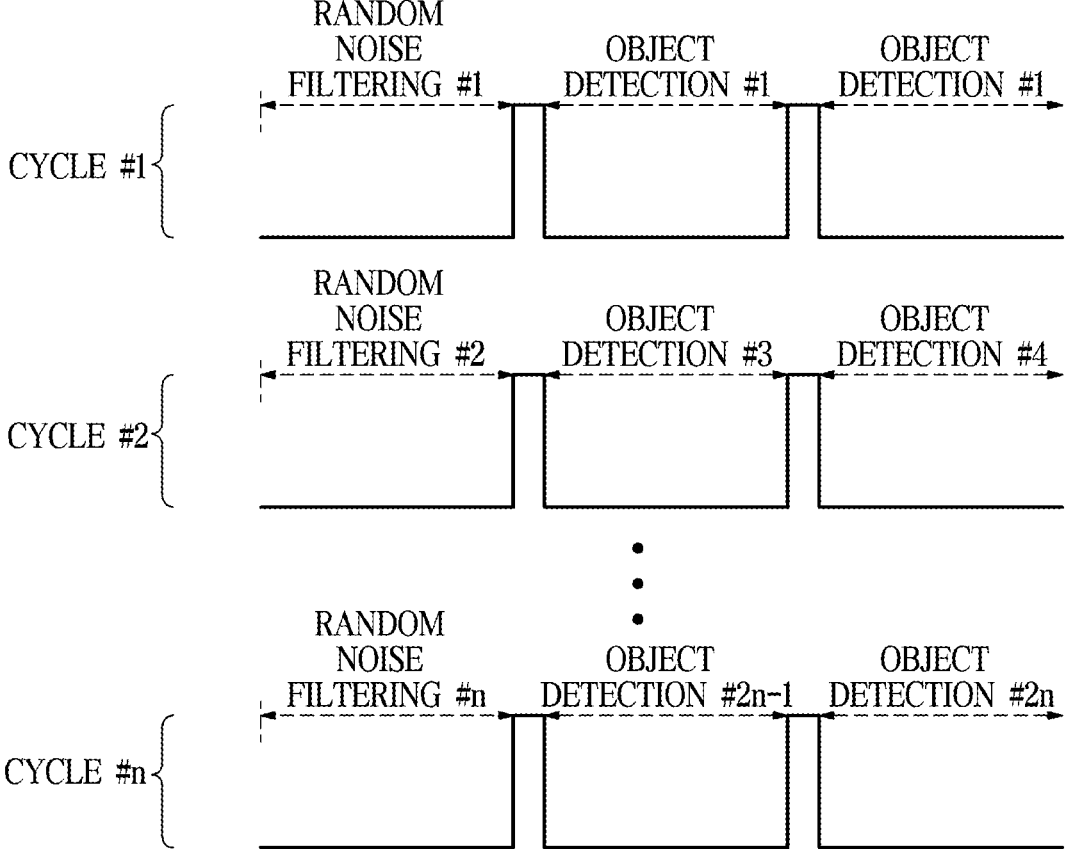
FIG. 10 is a diagram illustrating another example of a noise avoidance mode of a parking distance warning mode of a vehicle.

FIG. 10 is a diagram illustrating another example of a noise avoidance mode of a parking distance warning mode of a vehicle.

As shown in FIG. 10, a noise avoidance mode according to another example includes three or more cycles (cycle #1, cycle #2, . . . and cycle #n). That is, in the noise avoidance mode of parking distance warning mode according to another example shown in FIG. 10, object detection (object detections #1 to #2n) may be performed a total of 2n times during the n cycles (cycle #1, cycle #2, . . . and cycle #n). Accordingly, in the noise avoidance mode, in a case where an ultrasonic signal transmitted from the PDW sensor 150 of the vehicle 100 is reflected by an object (e.g., the object 210 in FIG. 2) and then is normally received by the corresponding PDW sensor 150, ultrasonic signals may be received (object detection) at approximately equal intervals (periods) t1 within each of the object detection #1 to the object detection #2n, as shown in FIG. 10. As such, in the noise avoidance mode of FIG. 10, by adding two or more cycles for object detection, reliability criteria of the PDW sensor 150 for objects located close to the vehicle 100 may be enhanced, and a noise avoidance performance may be greatly improved.

According to the examples of the disclosure, by adding cycles for object detection in the noise avoidance mode of the PDW sensor of the vehicle, the reliability criteria of the PDW sensor for objects located close to the vehicle 100 may be enhanced. Accordingly, a noise avoidance performance may be improved. In addition, by applying the above-described noise avoidance mode to all levels of autonomous driving including Remote Parking Pilot (RPP), Remote Smart Parking Assist (RSPA), or Parking Collision Avoidance Assist (PCA), user satisfaction with autonomous driving of the vehicle 100 may be greatly increased.

The present disclosure provides a vehicle and a control method thereof that may enhance reliability criteria of a parking distance warning sensor, thereby improving noise avoidance performance and minimizing occurrence of false warnings.

According to the disclosure, a vehicle may include: a sensor configured to detect an object around the vehicle; and a controller configured to perform a warning mode for generating a warning in response to the object being detected by the sensor, wherein the warning mode includes a first mode for detecting the object in a first preset driving condition of the vehicle and a second mode for detecting the object in a second preset driving condition of the vehicle, and wherein a number of object detection attempts in the second mode is set to be relatively greater than a number of object detection attempts in the first mode.

Detecting the object may include confirming a presence of the object and measuring a distance between the object and the vehicle.

The second preset driving condition may include stopping the vehicle, and stopping the vehicle may include stopping the vehicle or decelerating the vehicle below a preset speed.

The first preset driving condition may include resuming driving to exceed the preset speed after the vehicle is stopped or decelerated according to the second preset driving condition.

The controller may be configured not to generate the warning, in response to the object not being detected at equal intervals in the second mode.

The controller may be configured to switch the vehicle from the first mode to the second mode, in response to the object not being detected around the vehicle in the first mode.

The controller may be configured to switch the vehicle from the first mode to the second mode, based on a determination that the generation of the warning according to the detection of the object is not required even if the object around the vehicle is detected in the first mode.

The object detection attempt may be performed periodically in each of the first mode and the second mode.

The sensor may be an ultrasonic sensor configured to transmit and receive an ultrasonic signal, and transmission and reception of the ultrasonic signal may be performed in synchronization with an object detection attempt cycle.

Filtering for removing a non-periodically received signal may be performed in each of the first mode and the second mode.

According to the disclosure, a control method of a vehicle, including a sensor configured to detect an object around the vehicle and a controller configured to perform a warning mode for generating a warning in response to the object being detected by the sensor, may include: performing a first mode for detecting the object in a first preset driving condition of the vehicle, the first mode being included in the warning mode; and performing a second mode for detecting the object in a second preset driving condition of the vehicle, the second mode being included in the warning mode, wherein a number of object detection attempts in the second mode is set to be relatively greater than a number of object detection attempts in the first mode.

Detecting the object may include confirming a presence of the object and measuring a distance between the object and the vehicle.

The second preset driving condition may include stopping the vehicle, and stopping the vehicle may include stopping the vehicle or decelerating the vehicle below a preset speed.

The first preset driving condition may include resuming driving to exceed the preset speed after the vehicle is stopped or decelerated according to the second preset driving condition.

The control method may further include not generating the warning, in response to the object not being detected at equal intervals in the second mode.

The control method may further include switching the vehicle from the first mode to the second mode, in response to the object not being detected around the vehicle in the first mode.

The control method may further include switching the vehicle from the first mode to the second mode, based on a determination that the warning is not required to be generated in response to the object being detected around the vehicle in the first mode.

The object detection attempt may be performed periodically in each of the first mode and the second mode.

The sensor may be an ultrasonic sensor configured to transmit and receive an ultrasonic signal, and transmission and reception of the ultrasonic signal may be performed in synchronization with an object detection attempt cycle.

Filtering for removing a non-periodically received signal may be performed in each of the first mode and the second mode.

As is apparent from the above, according to the examples of the disclosure, the vehicle and the control method thereof can enhance reliability criteria of a parking distance warning sensor, thereby improving noise avoidance performance and minimizing occurrence of false warnings.

Meanwhile, the above examples can be stored in the form of a recording medium storing computer-executable instructions. The instructions may be stored in the form of a program code, and when executed by a processor, the instructions may perform operations of the disclosed examples. The recording medium may be implemented as a computer-readable recording medium.

The computer-readable recording medium includes all kinds of recording media in which instructions decoded by a computer are stored in, for example, a read only memory (ROM), random access memory (RAM), magnetic tapes, magnetic disks, flash memories, optical recording medium, and the like.

Although examples have been described for illustrative purposes, those skilled in the art will appreciate that various modifications, additions and substitutions are possible, without departing from the scope and spirit of the disclosure. Accordingly, examples have not been described for limiting purposes.

What is claimed is:

1. A vehicle, comprising:
   a sensor configured to detect an object outside of the vehicle; and
   a controller configured to cause object detection according to a warning mode for generating a warning based on the object being detected by the sensor,
   wherein the warning mode comprises, in a first preset driving condition of the vehicle, a first mode for detecting the object and, in a second preset driving condition of the vehicle different from the first preset driving condition, a second mode for detecting the object, and
   wherein a number of object detection attempts in the second mode is set to be greater than a number of object detection attempts in the first mode.

2. The vehicle of claim 1, wherein the sensor is configured to detect the object by confirming a presence of the object and measuring a distance between the object and the vehicle.

3. The vehicle of claim 1, wherein the second preset driving condition comprises:

stopping of the vehicle; or decelerating of the vehicle below a preset speed.

4. The vehicle of claim 3, wherein the first preset driving condition comprises accelerating of the vehicle, after satisfying the second preset driving condition, to meet or exceed the preset speed.

5. The vehicle of claim 1, wherein the controller is configured to, based on the object not being detected at regular intervals in the second mode, not to generate the warning.

6. The vehicle of claim 1, wherein the controller is configured to switch, based on no object being detected in the first mode, from causing object detection according to the first mode to causing object detection according to the second mode.

7. The vehicle of claim 1, wherein the controller is configured to switch, based on a determination that generation of a warning is not required based on a distance to an object detected according to the first mode, from causing object detection according to the first mode to causing object detection according to the second mode.

8. The vehicle of claim 1, wherein the controller is configured to cause the object detection attempts in the first mode or in the second mode to be performed periodically, and wherein the controller is configured to change a frequency of the object detection attempts in the second mode such that the frequency of the object detection attempts in the second mode is different from a frequency of noise signal receptions in the second mode.

9. The vehicle of claim 8, wherein the sensor comprises an ultrasonic sensor configured to transmit and receive an ultrasonic signal in synchronization with an object detection attempt cycle, and wherein the noise signal receptions in the second mode comprise ultrasonic signal receptions.

10. The vehicle of claim 1, wherein the controller is configured to cause object detection according to the first mode or the second mode by removing a non-periodical signal received from the sensor.

11. A control method of a vehicle comprising a sensor configured to detect an object outside of the vehicle and a controller configured to control object detection according to a warning mode for generating a warning in response to the object being detected by the sensor, the control method comprising:

causing, based on the vehicle satisfying a first preset driving condition, object detection according to a first mode of the warning mode; and causing, based on the vehicle satisfying a second preset driving condition, object detection according to a second mode of the warning mode, wherein a number of object detection attempts in the second mode is set to be greater than a number of object detection attempts in the first mode.

12. The control method of claim 11, wherein sensor is configured to detect the object by confirming a presence of the object and measuring a distance between the object and the vehicle.

13. The control method of claim 11, wherein the second preset driving condition comprises:

stopping of the vehicle; or decelerating of the vehicle below a preset speed.

14. The control method of claim 13, wherein the first preset driving condition comprises accelerating of the vehicle, after satisfying the second preset driving condition, to meet or exceed the preset speed.

15. The control method of claim 11, further comprising:

based on the object not being detected at regular intervals in the second mode, determining not to generate the warning.

16. The control method of claim 11, further comprising:

switching, based on no object being detected in the first mode, from causing object detection according to the first mode to causing object detection according to the second mode.

17. The control method of claim 11, further comprising:

switching, based on a determination that the warning is not required to be generated based on a distance to the object detected according to the first mode, from causing object detection according to the first mode to causing object detection according to the second mode.

18. The control method of claim 11, wherein causing the object detection according to the first mode or the second mode comprises causing the object detection attempts in the first mode or in the second mode to be performed periodically.

19. The control method of claim 18, wherein the sensor comprises an ultrasonic sensor configured to transmit or receive an ultrasonic signal in synchronization with an object detection attempt cycle.

20. The control method of claim 11, further comprising removing a non-periodical signal received from the sensor.

* * * * *